(12) United States Patent
Fukada

(10) Patent No.: US 7,372,897 B2
(45) Date of Patent: May 13, 2008

(54) PORTABLE INFORMATION COMMUNICATION TERMINAL, PROGRAM, AND RECORDING MEDIUM

(75) Inventor: Hiroyuki Fukada, Chiba (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 776 days.

(21) Appl. No.: 10/845,705

(22) Filed: May 14, 2004

(65) Prior Publication Data

US 2004/0228394 A1  Nov. 18, 2004

(30) Foreign Application Priority Data

May 16, 2003 (JP) .......................... P2003-139237

(51) Int. Cl.
*H04B 1/00* (2006.01)
(52) U.S. Cl. .................. 375/150; 370/319; 370/320; 370/321; 370/330; 370/335; 342/150; 342/151; 342/152; 342/153; 342/154; 342/193; 342/194; 342/196; 333/151; 333/152; 333/153; 333/154; 333/155; 333/193; 333/194; 333/196
(58) Field of Classification Search ................ 375/150; 370/342
See application file for complete search history.

(56) References Cited

U.S. PATENT DOCUMENTS

| | | | |
|---|---|---|---|
| 6,922,433 B2 * | 7/2005 | Tamura | 375/148 |
| 7,010,019 B2 * | 3/2006 | Reial | 375/148 |
| 7,039,099 B2 * | 5/2006 | Tamura et al. | 375/150 |
| 7,042,862 B1 * | 5/2006 | Hirade | 370/335 |
| 7,133,467 B2 * | 11/2006 | Nishio et al. | 375/316 |
| 7,151,792 B2 * | 12/2006 | Shimizu et al. | 375/148 |
| 7,209,512 B2 * | 4/2007 | Jitsukawa et al. | 375/148 |
| 2002/0003791 A1 | 1/2002 | Hayata | |
| 2004/0142729 A1 * | 7/2004 | Yuda et al. | 455/562.1 |

FOREIGN PATENT DOCUMENTS

EP    1 067 700    1/2001

* cited by examiner

*Primary Examiner*—Shuwang Liu
*Assistant Examiner*—Dhaval V Patel
(74) *Attorney, Agent, or Firm*—Frommer Lawerence & Haug LLP; William S. Frommer

(57) ABSTRACT

The number of times for averaging operation for averaging a correlation value of a received signal and a reference signal is properly controlled. When the correlation value is not averaged, since a lower limit value TH_A of a correlation level of a distribution of timings of which a path exists is larger than an upper limit value TH_B of a correlation level of a distribution of timings of which a path does not exist, the correlation value of a path is hidden by noise. Since the averaging operation is repeated until the relation of TH_A>TH_B is satisfied, the averaging operation is stopped when the relation is satisfied. The TH_A and TH_B are decided in accordance with RSCP and ISCP of a pilot channel and RSSI of a received base band signal.

12 Claims, 8 Drawing Sheets

(A) TH_A < TH_B
 (DISTRIBUTIONS OF CORRELATIVE LEVELS OVERLAP)

(B) TH_A = TH_B
 (DISTRIBUTIONS OF CORRELATIVE LEVELS CAN BE SEPARATED AT ONE POINT)

(C) TH_A > TH_B
 (DISTRIBUTIONS ARE COMPLETELY SEPARATED)

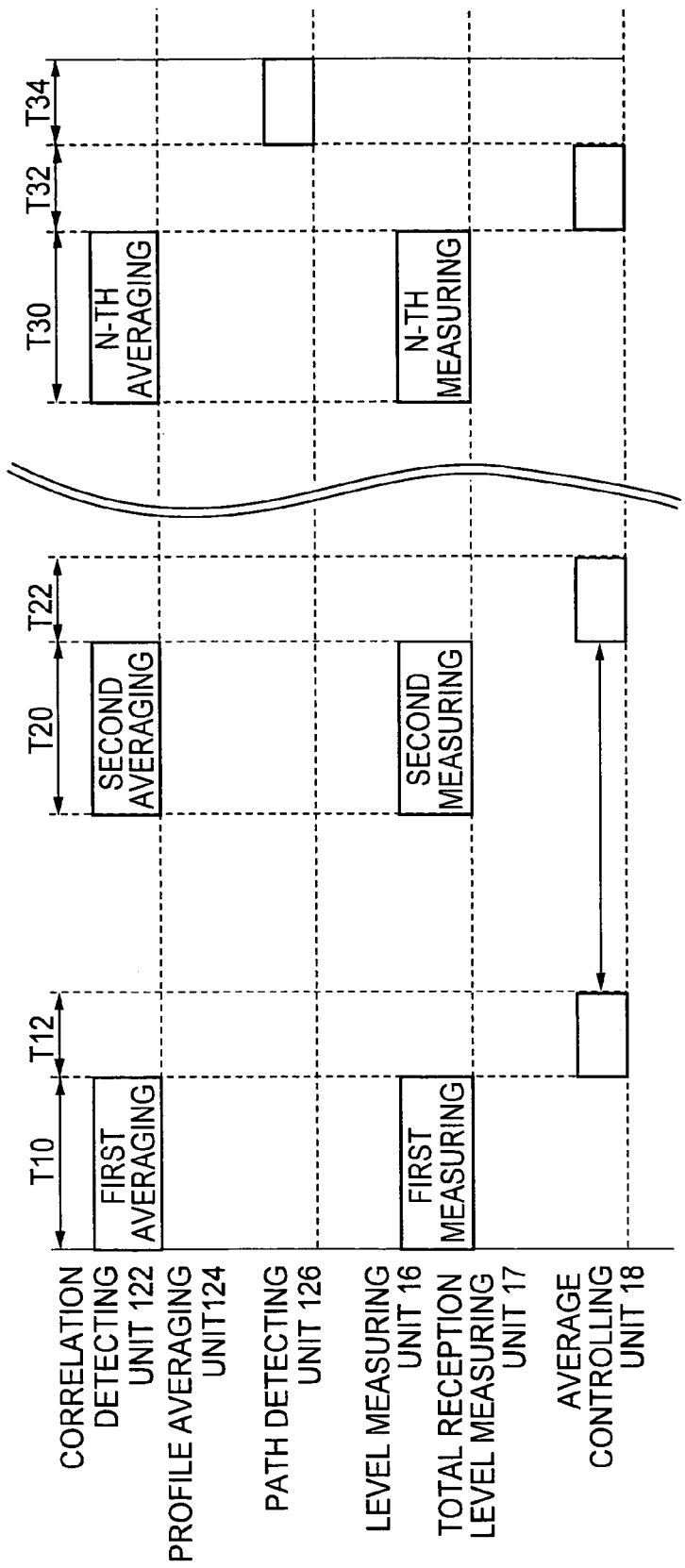

PORTABLE INFORMATION COMMUNICATION TERMINAL, PROGRAM, AND RECORDING MEDIUM

BACKGROUND OF THE INVENTION

1. Field of the Invention

The present invention relates to a portable information communication terminal having a function of for detecting multiple paths over a wireless transmission line, a program for such function, and recording medium on which the program is recorded.

2. Description of Related Art

In the direct sequence spread spectrum (DS-SS) system, multiple paths over a wireless transmission line are detected. Received signals of the multiple paths are rake-combined so as to alleviate influence of fading due to the multiple paths and improve the communication quality. Thus, a function for accurately detecting multiple paths to be rake-combined is important for a receiving apparatus of the direct sequence spread spectrum wireless communication.

To detect multiple paths, correlating calculations for received signals and a reference signal are required. In addition, to improve the detection accuracy of multiple paths, the correlating calculations are performed several times, and thus obtained results are averaged in general. These calculating process takes a relatively large part in all the receiving process. Thus, it is important to minimize the number of times (operating time) for the averaging operation is performed so as to reduce the power consumption of the receiving apparatus.

A method for suppressing the number of times for the averaging operation by deciding the number of times for the averaging operation in accordance with output levels of a correlation device that performs the correlating calculations for the received signals and the reference signal is disclosed in a first and a second related art references. A third related art reference discloses a method for decreasing an operation time by omitting an unnecessary cumulative adding operation.

The first related art reference is Japanese Patent Laid-Open Publication No. 2002-26768, the second related art reference is Japanese Patent Laid-Open Publication No. 2001-267958, and the third related art reference is Japanese Patent Laid-Open Publication No. 2001-136101.

However, when the number of times for the averaging operation is decided in accordance with the output levels of the correlation device, the following problems will arise.

First, the outputs of the correlation device are complex correlation values. Thus, it is preferred to perform an averaging operation by a coherent adding operation. However, the averaging operation by the coherent adding operation is difficult. Thus, after the outputs of the correlation device are converted into power values or amplitude values, thus converted values are averaged. However, the measurement accuracy of levels obtained by that method is inferior to that obtained through the averaging operation by the coherent adding operation. Since the number of times for the averaging operation is decided in accordance with the inaccurate outputs of the correlation device, the number of times for the averaging operation cannot be accurately decided.

The output levels of the correlation device have to be decided in accordance with the past reception states, and should not be decided with the current reception state. Thus, the number of times for the averaging operation cannot be derived in accordance with the current reception state.

In the actual receiving apparatus, the number of fingers is limited. In other words, since the number of paths that are able to be assigned is limited, if the paths that exceed the limited number are detected, this means that unnecessary process is preformed. However, in the related art references, control for the number of times for the averaging operation is not carried out in accordance with the number of fingers that is able to be assigned. Thus, the methods according to the related art references are not effective.

SUMMARY OF THE INVENTION

In view of the foregoing, it would be desirable to provide a technology for properly controlling the number of times for averaging operation for averaging correlation values of received signals and a reference signal.

The present invention relates to a portable information communication terminal. The portable information communication terminal comprises a correlation detecting unit, an averaging unit, a path detecting unit, a first reception state measuring unit, and an averaging operation controlling unit. The correlation detecting unit correlates a received base band signal and a reference code sequence. The averaging unit averages an output of the correlation detecting unit. The path detecting unit detects a path of the received base band signal in accordance with the output of the averaging unit. The first reception state measuring unit measures a reception state of a simultaneous received signal simultaneously received along with the received base band signal. The averaging operation controlling unit controls the number of times for averaging operation by the averaging unit in accordance with the measured reception state of the simultaneous received signal.

The portable information communication terminal according to the present invention further comprises a second reception state measuring unit. The second reception state measuring unit measures a reception state of the received base band signal. The averaging operation controlling unit controls the number of times for the averaging operation by the averaging unit in accordance with the measured reception state of the simultaneous received signal and the measured reception state of the received base band signal.

Other principle features and advantages of the present invention will become apparent to those skilled in the art upon review of the following drawing, the detailed description, and the appended claims.

BRIEF DESCRIPTION OF THE DRAWINGS

The invention will become more fully understood from the following detailed description, taken in conjunction with the accompanying drawing, wherein like reference numerals denote like elements, in which:

FIG. 8 is a timing chart according to the embodiment of the present invention.

DESCRIPTION OF THE PREFERRED EMBODIMENT

Figure 1:
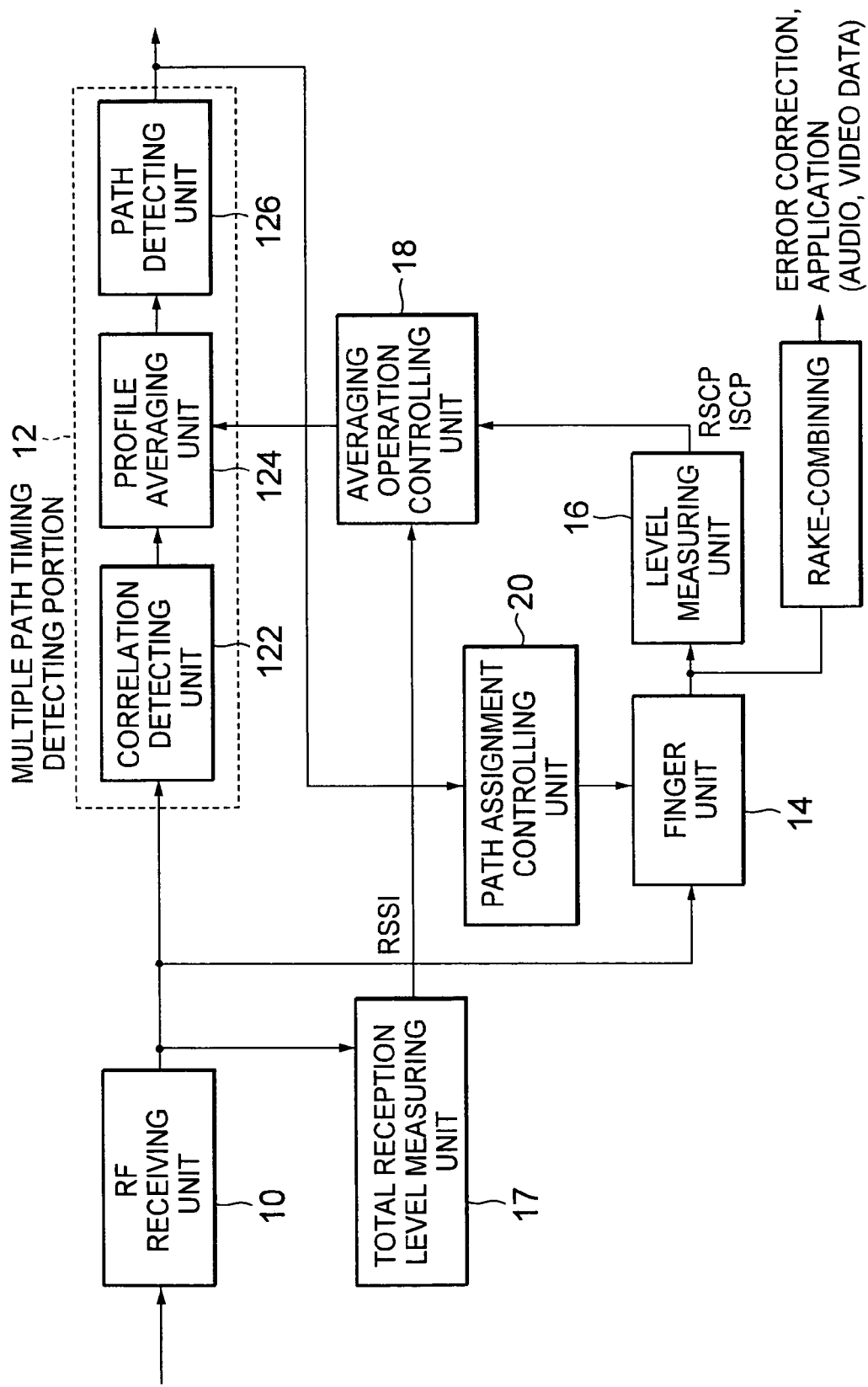
FIG. 1 is a functional block diagram showing a structure of a portable information communication terminal according to an embodiment of the present invention.

Next, with reference to the accompanying drawings, an embodiment of the present invention will be described. FIG. 1 is a functional block diagram showing a structure of a portable information communication terminal 1 according to the embodiment of the present invention. The portable information communication terminal 1 comprises an RF receiving unit 10, a multiple path timing detecting unit 12, a finger unit 14, a level measuring unit (that corresponds to first reception state measuring means) 16, a total reception level measuring unit (corresponds to second reception state measuring means) 17, an averaging operation controlling unit 18, and a path assignment controlling unit 20. Each block shown in FIG. 1 performs a receiving process of the portable information communication terminal 1. Since units for a transmitting process and a user interface do not directly relate to the embodiment of the present invention, they are omitted in FIG. 1.

The RF receiving unit 10 down-converts a received radio frequency (RF) signal into a desired base band signal.

The multiple path timing detecting unit 12 detects a plurality of paths of the received base band signal. The multiple path timing detecting unit 12 has a correlation detecting unit 122, a profile averaging unit 124, and a path detecting unit 126.

The correlation detecting unit 122 correlates the received base band signal and a reference code sequence. The reference code sequence is a pilot signal that is known by the transmitting side and the receiving side. Now, the received base band signal is denoted by r(t) and the reference code sequence is denoted by c(k) (where k=0, 1, . . . ). Then the correlation detecting unit 122 obtains a cross correlation corr(φ, τ) of a base band signal r(t) at a particular time transition τ and a reference code sequence c(k) at a particular reference code phase φ by the following formula, where the c(k) represents a transmission signal of a common pilot channel (CPICH), and a known symbol pattern and a known spread code are combined.

$$corr(\phi, \tau) = \frac{1}{N_{coherent}} \sum_{k=\phi}^{\phi+N_{coherent}} r(\tau + k \cdot T_{chip}) \cdot c(k)^* \quad \text{[Formula 1]}$$

WHERE
$N_{coherent}$: NUMBER OF CHIPS THAT DETECT COHERENT CORRELATIONS
$T_{chip}$: CHIP TIME
$|c(k)|=1$
$c(k)=Sym(k)\cdot Code(k)$

WHERE $$Sym(k) = \frac{1}{\sqrt{2}}(1+j) : \text{FOR ALL } k$$

Code (R): SPREAD CODE SEQUENCE (GOLD CODE PERIOD=38400)
Code (k)=Code (R+38400)

The correlation detecting unit 122 outputs an amplitude corrabs(φ,τ) of the cross correlation corr(φ, τ) in accordance with the cross correlation corr(φ,τ). The amplitude corrabs (φ,τ) is given by for example the following formula.

$$corrabs(\phi, \tau) = \sqrt{\text{Re}[corr(\phi, \tau)]^2 + \text{Im}[corr(\phi, \tau)]^2} \quad \text{[Formula 2]}$$

Figure 2:
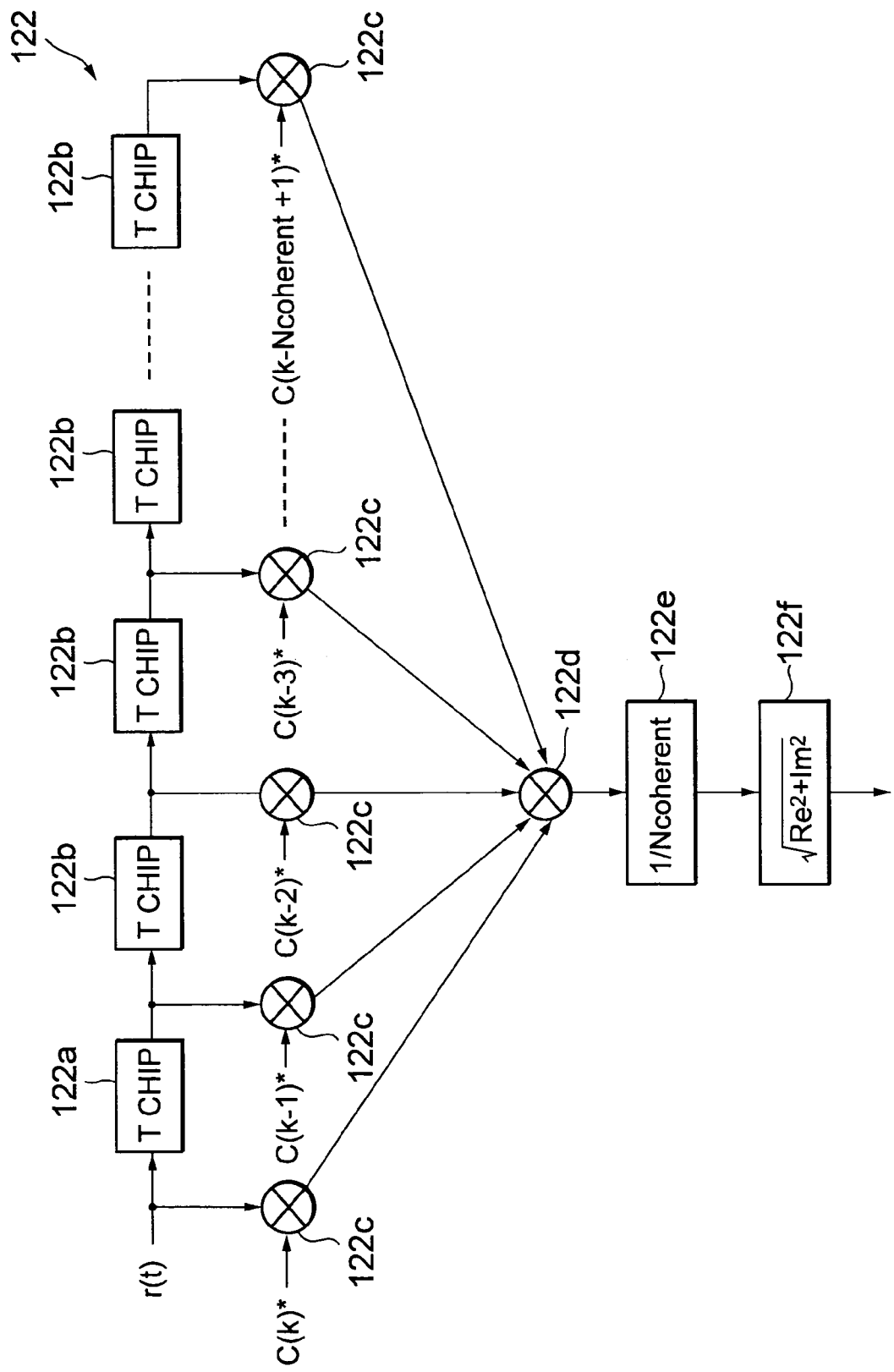
FIG. 2 is a schematic diagram showing a structure of a correlation detecting unit.

FIG. 2 shows a structure of the correlation detecting unit 122. The correlation detecting unit 122 has an initial delaying device 122a, a plurality of delaying devices 122b, a plurality of multiplying devices 122c, an adding device 122d, a dividing device 122e, and an amplitude detecting device 122f.

The initial delaying device 122a delays the received base band signal r(t) by $T_{chip}$. Each delaying device 122b delays an input of the initial delaying device 122a or the preceding delaying device 122b by $T_{chip}$. Each multiplying device 122c multiplies an output of the initial delaying device 122a or a delaying device 122b by the reference code sequence c(k). The adding device 122d adds the output of each multiplying device 122c. The dividing device 122e divides the output of the adding device 122d by $N_{chherent}$. Thus, the cross correlation corr(φ, τ) is obtained. The amplitude detecting device 122f obtains the amplitude of the cross correlation corr(φ, τ) as an output of the adding device 122d.

When the received base band signal is correlated in the preceding manner, unless there is noise and interference, it is clear that the correlation level (an output of the correlation detecting unit 122) at a timing (time transition) of which a path exists is larger than the correlation level at which a path does not exist. Thus, a timing at which a path exists can be detected.

Figure 3:
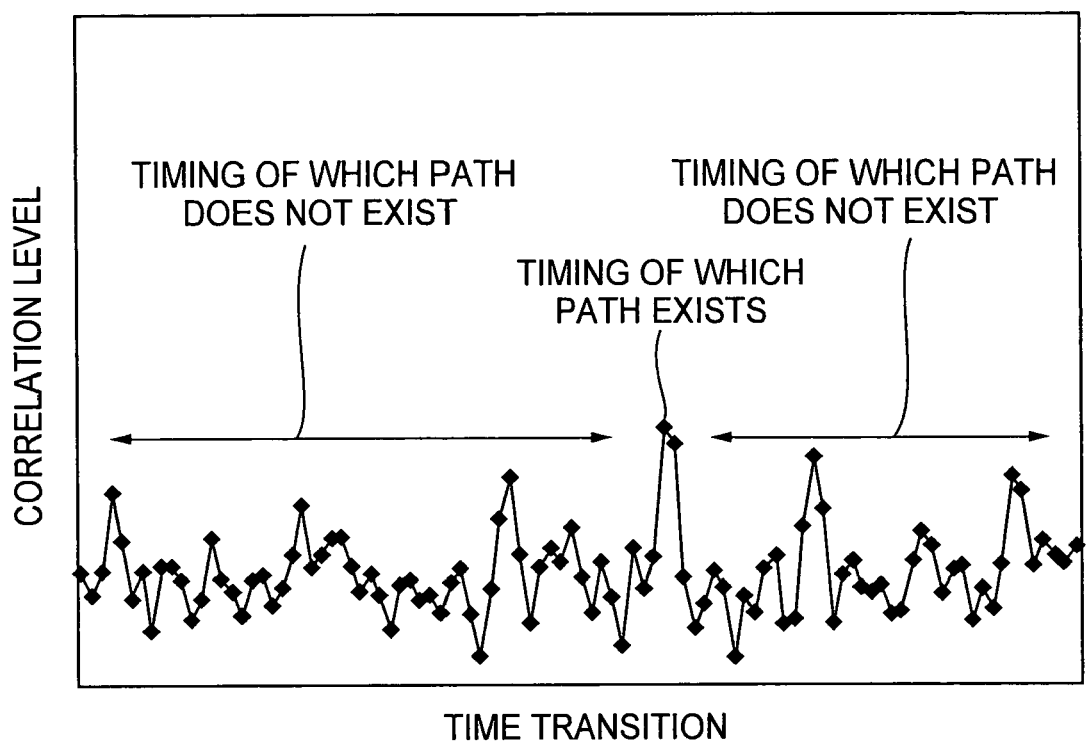
FIG. 3 is a graph showing a correlation level at a timing of which a path exists (does not exist)

However, sometimes noise and interference may be large. In this case, as shown in FIG. 3, it cannot be said that the correlation level at a timing of which a path exists is larger than the correlation level at a timing of which a path does not exist. Rather, the correlation level at a timing of which a path exists is hidden by the correlation level at a timing of which a path does not exist.

The profile averaging unit 124 averages the output of the correlation detecting unit 122 so that the correlation level (the output of the correlation detecting unit 122) of a timing (time transition) at a timing of which a path exists is sufficiently larger than the correlation level at a timing of which a path does not exist.

The profile averaging unit 124 outputs an averaged correlative profile that is the averaged output of the correlation detecting unit 122 for each time transition τ. An averaged correlative profile profile (τ) of which the output of the correlation detecting unit 122 is averaged by $N_{ave}$ times is given by for example the following formula.

$$\text{profile}(\tau) = \sum_{k=1}^{N_{cove}} corrabs(\phi_k, \tau) \quad \text{[Formula 3]}$$

Figure 4:
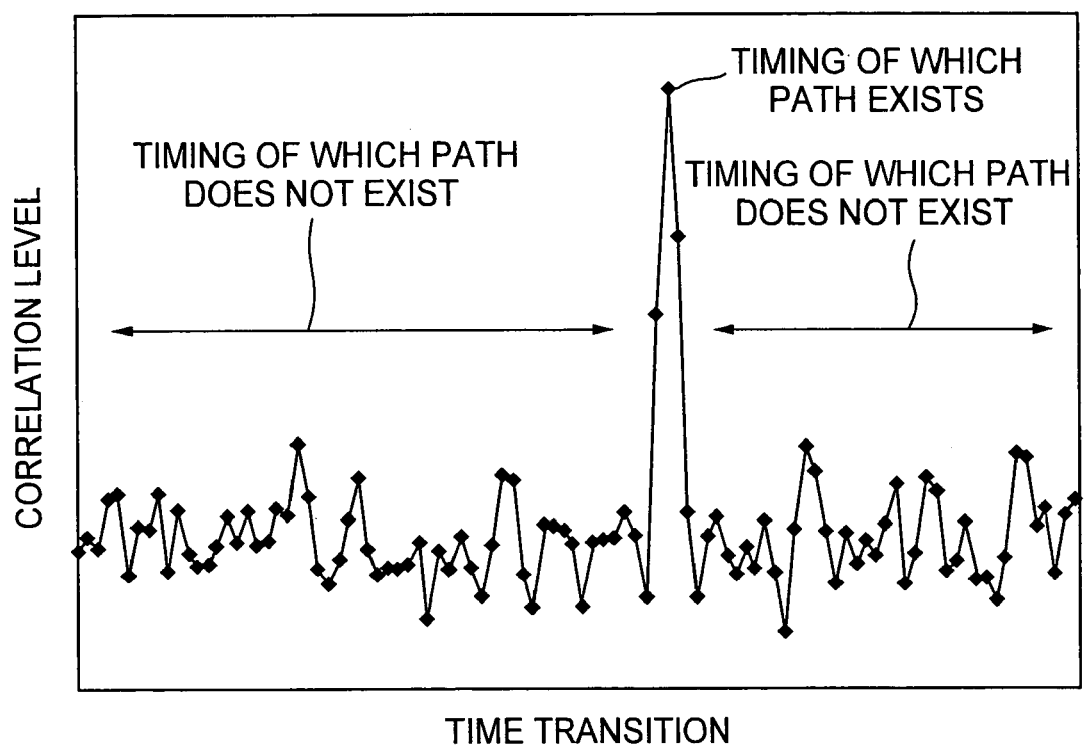
FIG. 4 is a graph showing an averaged correlation level at a timing of which a path exists (does not exist)

When the output of the correlation detecting unit 122 is averaged for a long time period, it is clear that the correlation level at a timing of which a path exists is larger than the correlation level at a timing of which a path does not exist (see FIG. 4).

The path detecting unit 126 outputs a plurality of path timings and path levels in accordance with the averaged correlative profile that is output from the profile averaging unit 124. The path detecting unit 126 compares the averaged correlative profile with a predetermined threshold value for each time transition τ. When the averaged correlative profile exceeds the predetermined threshold value, the τ of the averaged correlative profile is defined as a path timing. When a path timing is detected, a plurality of paths are rake-combined in accordance with the detected path timing.

The finger unit 14 is composed of a plurality of active correlation devices for receiving a plurality of paths. The finger unit 14 always operates during communication. The finger unit 14 receives a pilot channel (CPICH) by which the receiving side is synchronized with the transmitting side along with a communication channel on which information such as voice and data is transmitted. Thus, the pilot signal is received along with the received base band signal. The pilot channel is transmitted with a known signal pattern. The receiving side is able to detect a phase difference between the received signal and the transmitted signal and a reception level by despreading the pilot channel.

According to the present embodiment, the pilot channel is despread, and with this result, a reception level is measured. Thus, with the pilot channel, the number of times for averaging operation is controlled in the multiple path timing detecting process.

Each active correlation device outputs the despread result for a time period of $T_{chip} \times SF$. The despread result (despread symbol) pilot_despread of the pilot channel that is an i-th output of the active correlation device j is given by the following formula.

$$\text{pilots\_despread}(j, i) = \sum_{k=i \cdot SF}^{SF \cdot (i+1)} r(\tau_j + k \cdot T_{chip}) \cdot c(k)^* \quad [\text{Formula 4}]$$

$\tau_j$: TIME TRANSITION (PATH TIMING) DESPREAD BY ACTIVE CORRELATING DEVICE j

SF: SPREAD RATE OF PILOT CHANNEL

The foregoing despread result is output from the finger unit 14, and the result is input to the level measuring unit 16. Unlike the correlation detecting unit 122, one active correlation device j of the finger unit 14 performs a correlating calculation for one time transition τj. It is assumed that the foregoing despread symbol is always output although the averaging operation controlling unit 18 controls the number of times for the averaging operation.

The output of the finger unit 14 is used to rake-combine a plurality of paths. The rake-combined data is also used for error corrections and applications (voice, picture data, and so forth).

The level measuring unit 16 coherently adds the plurality of despread results, averages them, and converts the result into a power value. Since the plurality of despread results are coherently added and averaged, received signal code power (RSCP) and interference signal code power (ISCP) can be accurately measured. The level measuring unit 16 measures the RSCP and the ISCP for each of finger units. The RSCP and the ISCP of a path received by a finger unit j are given by the following formula.

$$\text{RSCP\_finger}(j, i) = \left| \frac{1}{N_{mes}} \cdot \sum_{k=i \cdot N_{mes}}^{N_{mes}(i+1)} \left[ \frac{1}{SF} \cdot \text{pilot\_despread}(j, k) \right] \right|^2 \quad [\text{Formula 5}]$$

$$\text{ISCP\_finger}(j, i) = \frac{1}{N_{met}} \cdot \sum_{k=i \cdot N_{mes}}^{N_{mes}(i+1)} \left| \frac{1}{SF} \cdot \text{pilot\_despread}(j, k) \right|^2 -$$

$$\left| \frac{1}{N_{met}} \cdot \sum_{k=i \cdot N_{mes}}^{N_{mes}(i+1)} \left[ \frac{1}{SF} \cdot \text{pilot\_despread}(j, k) \right] \right|^2$$

$N_{mes}$: NUMBER OF AVERAGED MEASURED SYMBOLS

RSCP_finger(j,i): FINGER NUMBER j, i-th MEASURED VALUE OF RSCP

ISCP_finger(j,i): FINGER NUMBER j, i-th MEASURED VALUE OF ISCP

Thus, it is possible to obtain accurate measured value by coherently adding and averaging the $N_{mes}$ of the despread results.

The total reception level measuring unit 17 measures all the power of the received base band signal so as to obtain a total reception level, namely a received signal strength indicator (RSSI). In other words, the total reception level measuring unit 17 converts the received signals r(t) into power values, averages them, and obtains the RSSI. The RSSI is given by the following formula.

$$RSSI(i) = \frac{1}{N_{RSSI}} \sum_{R=i \cdot N_{RSSI}}^{N_{RSSI}(i+1)} |r(k \cdot T_{chip})|^2 \quad [\text{Formula 6}]$$

$N_{RSSI}$: NUMBER OF TIMES FOR AVERAGING OPERATION FOR MEASURING RSSI

RSSI(i): i-th MEASURED VALUE OF RSSI

The averaging operation controlling unit 18 controls the number of times for the averaging operation by the profile averaging unit 124 in accordance with the measured results of the level measuring unit 16 and the total reception level measuring unit 17.

Figure 5:
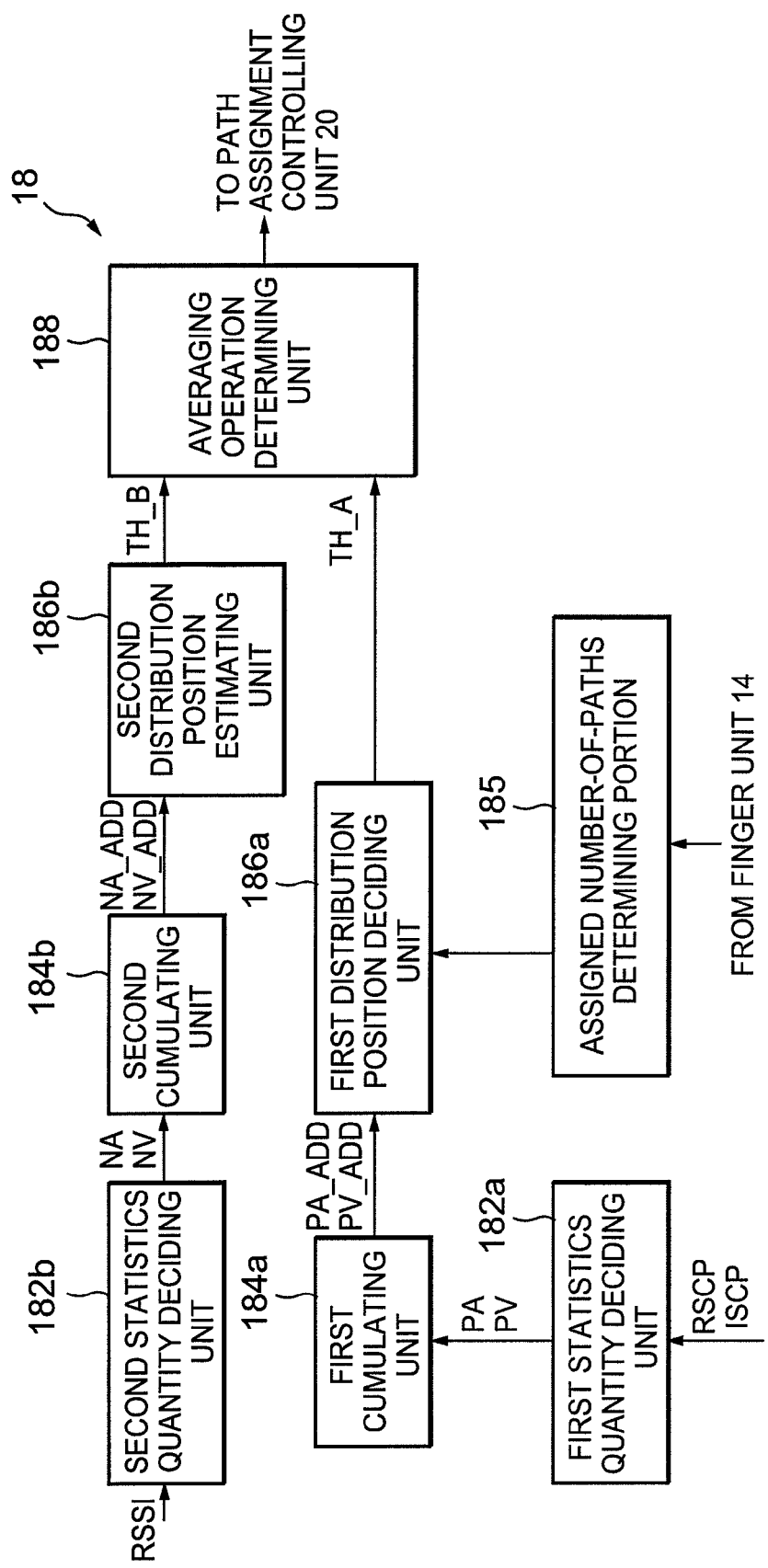
FIG. 5 is a schematic diagram showing a structure of an averaging operation controlling unit.

FIG. 5 shows a structure of the averaging operation controlling unit 18. The averaging operation controlling unit 18 has a first statistics quantity deciding unit 182a, a second statistics quantity deciding unit 182b, a first cumulating unit 184a, a second cumulating unit 184b, an assigned number-of-paths determining unit 185, a first distribution position estimating unit 186a, a second distribution position estimating; unit 186b, and an averaging operation determining unit 188.

The first statistics quantity deciding unit 182a receives the RSCP and the ISCP from the level measuring unit 16 and decides an average PA and a variance PV of a distribution of correlation values in a time transition of which a path exists. The PA and PV are given by the following formula.

[Formula 7]

$PA(j) = C_{RSCP} \cdot \sqrt{\text{RSCP\_finger}(j,i)} + D_{RSCP}$ $PV(j) = C_{ISCP} \cdot \text{ISCP\_finger}(j,i) + D_{ISCP}$ The coefficients of the foregoing formulas depend on the RSCP/ISCP and are given by the following tables Table 1 and Table 2.

TABLE 1

| $N_{coherent} \cdot \dfrac{RSCP\_finger}{ISCP\_finger}$ | $C_{RSCP}$ | $D_{RSCP}$ |
|---|---|---|
| 0 OR MORE AND LESS THAN 1 | 0.2 | 1.2 |
| 1 OR MORE AND LESS THAN 2 | 0.5 | 0.7 |
| 2 OR MORE | 1 | 0 |

TABLE 2

| $N_{coherent} \cdot \dfrac{RSCP\_finger}{ISCP\_finger}$ | $C_{ISCP}$ | $D_{ISCP}$ |
|---|---|---|
| 0 OR MORE AND LESS THAN 1 | 0.5 | 0 |
| 1 OR MORE AND LESS THAN 2 | 0.6 | 0 |
| 2 OR MORE | 0.7 | 0 |

The second statistics quantity deciding unit 182b receives the RSSI from the total reception level measuring unit 17 and decides an average NA and a variance NV of a distribution of correlation values in a time transition of which a path does not exist. The NA and NV are given by the following formula.

[Formula 8]

$$NA = C_{RSSI} \cdot \sqrt{RSSI(i)}$$

$$NV = D_{RSSI} \cdot RSSI(i)$$

TABLE 3

| $C_{RSSI}$ | 1.1 |
|---|---|
| $D_{RSSI}$ | 1.4 |

The first cumulating unit 184a cumulates an average PA and a variance PV of a distribution of correlation values in a time transition of which a path exists by the following formula. The second cumulating unit 184b cumulates an average NA and a variance NV of a distribution of correlation values in a time transition of which a path does not exist by the following formula.

[Formula 9]

$$PA\_add(j) = PA\_add(j) + PA(j)$$

$$PV\_add(j) = PV\_add(j) + PV(j)$$

$$NA\_add = NA\_add + NA$$

$$NV\_add = NV\_add + NV$$

For example, PA_add(1)=PA(1); PA_add(2)=PA_add(1)+PA(2)=PA(1)+PA(2); and PA_add(3)=PA_add(2)+PA(3)=PA(1)+PA(2)+PA(3).

The cumulated results PA_add(N), PV_add(N), NA_add(N), and NV_add(N) represent averages and variances of which an averaging operation is preformed by N times. This is because when random sequences that are not correlated (their covariance is 0) are added, the average and variance of the added sequences are the sum of the averages and the sum of the variances, respectively, of the sequences that are not added.

The assigned number-of-paths determining unit 185 receives the number of paths assigned to the pilot channel from the finger unit 14 and determines whether or not the number of paths assigned reaches the upper limit of paths that can be assigned. When the number of paths that are assigned reaches the upper limit, it is clear that paths are assigned to all the finger units.

The first distribution position estimating unit 186a estimates a distribution of correlation values (specifically, the lower limit value TH_A) in a time transition of which a path exists in accordance with the average PA_add(N) and variance PV_add(N) of which the distribution of correlation values in the time transition of which the path exists are averaged N times.

When the number of paths assigned to the pilot channel does not reach the upper limit of paths that can be assigned, the TH_A is decided by the following formula.

$$TH\_A = PA\_add(MaxFinger) - \alpha \sqrt{PV\_add(MaxFinger)} \qquad \text{[Formula 10]}$$

WHERE
MaxFinger: FINGER NUMBER OF WHICH PA_add IS THE MAXIMUM.
α,β: PARAMETERS FOR WHICH TH_A AND TH_B ARE DECIDED.

In this case, these α and β are given by the following table.

TABLE 4

| α | 3.2 |
|---|---|
| β | 3.2 |

When the number of paths assigned to the pilot channel reaches the upper limit of paths that can be assigned, the TH_A is decided by the following formula. In the following formula, α and β are the same as those of Formula 10.

$$TH\_A = PA\_add(MinFinger) - \alpha \sqrt{PV\_add(MinFinger)} \qquad \text{[Formula 11]}$$

MinFinger: FINGER NUMBER OF WHICH PA_add IS THE MAXIMUM.
α,β: PARAMETERS FOR WHICH TH_A AND TH_B ARE DECIDED.

The second distribution position estimating unit 186b estimates a distribution of correlation values (specifically, the upper limit TH_B) in a time transition of which a path exists in accordance with the average NA_add(N) and variance NV_add(N) of which a distribution of correlation values in a time transition of which a path does not exist are averaged N times.

The TH_B is decided by the following formula. In the following formula, α and β are the same as those of Formula 10.

[Formula 12]

$$TH\_B = NA\_add + \beta \sqrt{NV\_add}$$

α,β: PARAMETERS FOR WHICH TH_A AND TH_B ARE DECIDED.

The averaging operation determining unit 188 receives the TH_A and the TH_B from the first distribution position estimating unit 186a and the second distribution position estimating unit 186b, respectively. When the relation of TH_A>TH_B (or TH_A≧TH_B) is satisfied, the profile averaging unit 124 completes the number of times for the averaging operation. This is because when the relation of TH_A>TH_B is satisfied, since the profile averaging unit 124 performs the averaging operation, it is clear that the correlation level at a timing of which a path exists is larger than the correlation level at a timing of which a path does not exist.

Figure 6A:
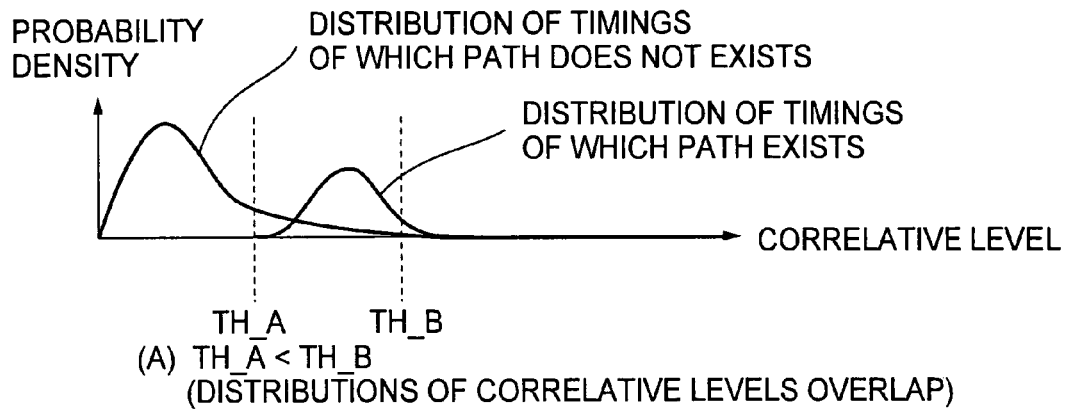
FIG. 6A, FIG. 6B, and FIG. 6C are schematic diagrams showing probability distributions of correlation levels at a timing of which a path exists and a timing of which a path does not exist in the conditions of TH_A<TH_B, TH_A=TH_B, and TH_A>TH_B, respectively.
Figure 6B:
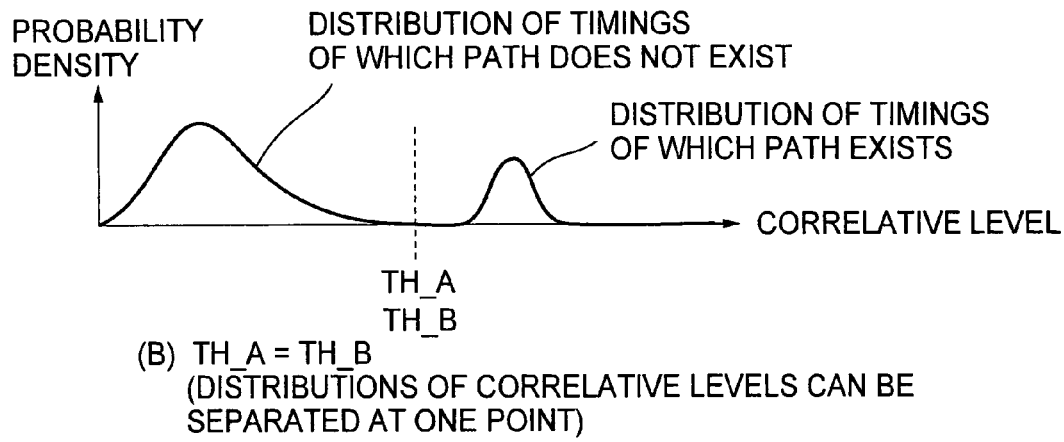
Figure 6C:
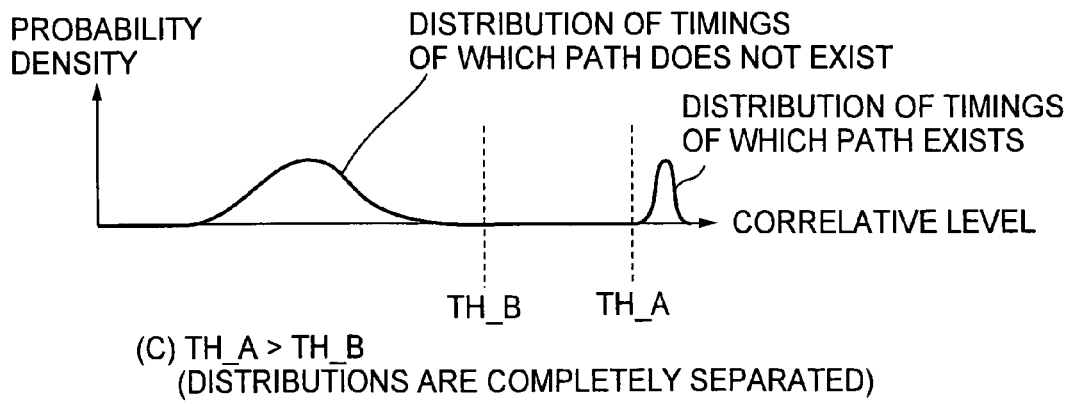

Why the foregoing situation takes place when the relation of TH_A>TH_B is satisfied will be described with reference to FIG. 6A, FIG. 6B, and FIG. 6C. If the averaging operation are not performed (or were insufficiently performed), the probability distribution of correlation levels at a timing of which a path exists and the probability distribution at a timing of which a path does not exist are shown in FIG. 6A. In other words, the correlation level at a timing of which a path exists is higher than the correlation level at a timing of which a path does not exist. However, sometimes the correlation level at a timing of which a path exists is lower than the correlation level at a timing of which a path does not exist. This is because the lower limit value TH_A at a timing of which a path exists is smaller than the upper limit value TH_B of the correlation level at a timing of which a path does not exist. In this case, as shown in FIG. 3, the correlation level at a timing of which a path exists is hidden by the correlation level at a timing of which a path does not exist as shown in FIG. 3.

When an averaging operation is performed, the correlation level at a timing of which a path does not exist is smaller than the correlation level at a timing of which a path exists. When the averaging operation is repeated, the state changes from TH_A<TH_B to TH_A=TH_B (see FIG. 6B), and to TH_A>TH_B (see FIG. 6C). When the relation of TH_A>TH_B is satisfied, the correlation level at a timing of which a path exists is never lower than the correlation level at a timing of which a path does not exist. Thus, as shown in FIG. 4, the correlation level at a timing of which a path exists becomes clear.

Depending on whether or not the number of paths assigned to the pilot channel reaches the upper limit of paths that can be assigned, the finger number for which the TH_A and TH_B are obtained is varied by the following reason.

As described above, when a path timing is detected, a plurality of paths are rake-combined. When signals of a plurality of paths are combined, a rake-combined gain is obtained by the path diversity effect. As a result, the quality of the received signal can be improved.

When the number of paths assigned to the pilot channel does not reach the upper limit of paths that can be assigned, if paths whose levels are relatively low are rake-combined, the rake-combined gain would be low and ineffective. Thus, the TH_A for a finger number whose PA_add is the maximum is obtained. This represents that if a path having the maximum level can be detected from multiple paths, not hidden therein, no further averaging operation is required. As a result, the number of times for the averaging operation is decreased. In addition, when paths having relatively the maximum level in the multiple paths are rake-combined, since the rake-combined gain is high, the paths can be effectively rake-combined.

On the other hand, when the number of paths assigned to the pilot channel reaches the upper limit of paths that can be assigned, it is meaningless to detect a path whose level is lower than the minimum level of paths that are assigned. Thus, the TH_A of a finger whose PA_add is the minimum is obtained. This represents that when a path whose level is the minimum in multiple paths is detected, not buried thereby, no further averaging operation is required. As a result, the number of times for the averaging operation can be decreased.

Returning to FIG. 1, the path assignment controlling unit 20 decides paths received by fingers and assigns the paths to the finger unit 14 in accordance with the path timings and path levels that are output from the path detecting unit 126 and information about paths that are assigned to the fingers so that the reception quality becomes maximum.

Figure 7:
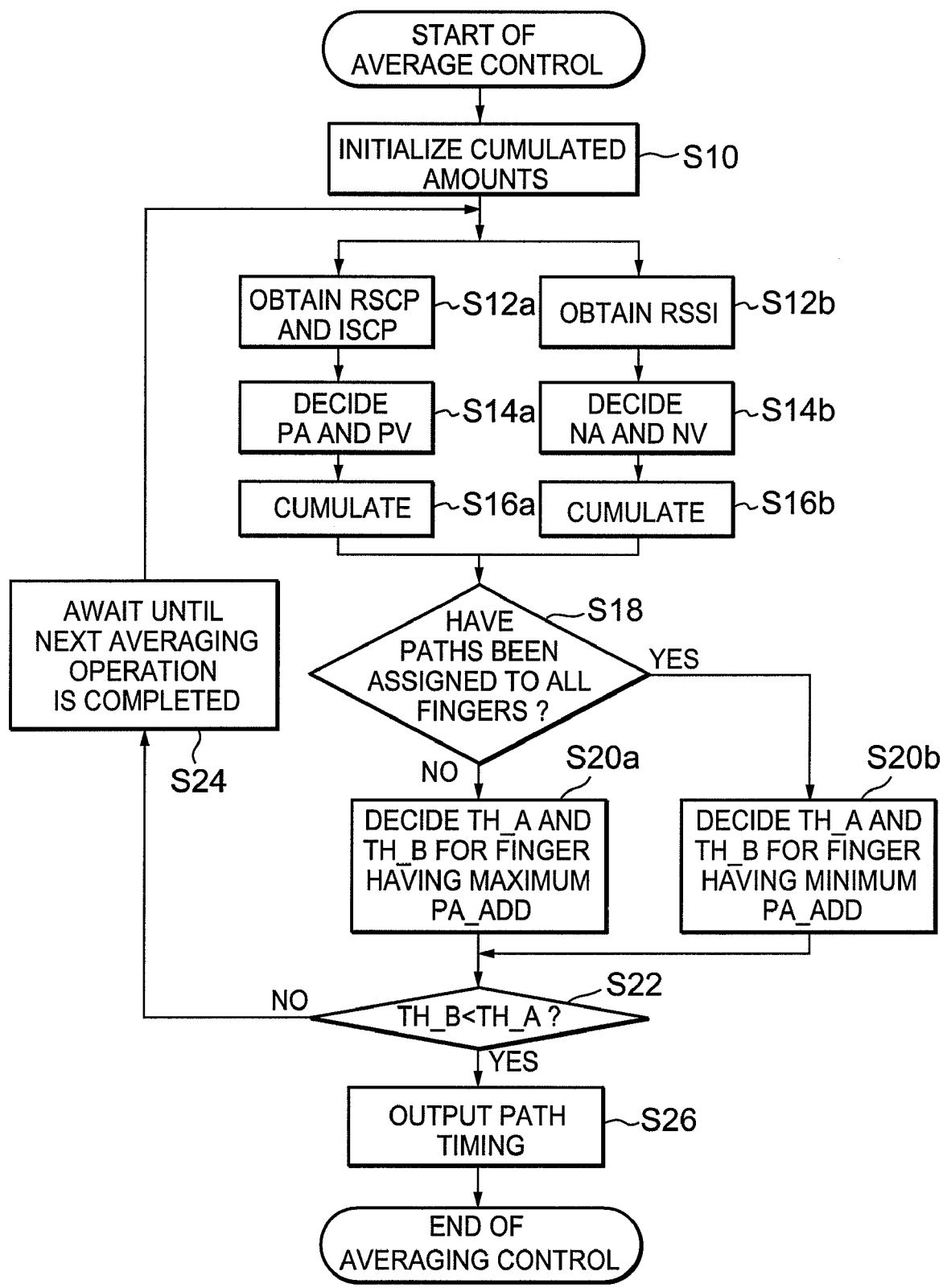
FIG. 7 is a flow chart showing an operation of an averaging operation controlling unit according to the embodiment of the present invention.

Next, an operation of the embodiment of the present invention will be described. FIG. 7 is a flow chart showing an operation of the averaging operation controlling unit 18 according to the embodiment of the present invention. FIG. 8 is a timing chart according to the embodiment of the present invention.

First of all, the RF receiving unit 10 of the portable information communication terminal 1 receives an RF signal, down-converts the received signal, and obtains a desired reception base band signal. The reception base band signal is also sent to the finger unit 14. The finger unit 14 despreads the base band signal and obtains a pilot channel.

The received base band signal is correlated with a reference code sequence by the correlation detecting unit 122. A correlation level is averaged by the profile averaging unit 124 (in T10, see FIG. 8). At the same timing, the RSCP and ISCP of the output of the finger unit 14 are measured by the level measuring unit 16 (in T10). At the same timing, the RSSI of the received base band signal is measured by the total reception level measuring unit 17 (in T10).

The averaging operation controlling unit 18 controls the number of times for averaging operation in accordance with the RSCP and ISCP measured by the level measuring unit 16 and the RSSI measured by the total reception level measuring unit 17 (in T12). It should be noted that the averaging operation controlling unit 18 controls the number of times for the averaging operation in accordance with the received base band signal correlated with the reference code sequence by the correlation detecting unit 122 and the pilot base channel received at the same time.

With reference to FIG. 7, first of all, cumulated amounts PA_add(N), PV_add(N), NV_add(N), and NV_add(N) are initialized, namely set to 0 at step S10. Thereafter, the first statistics quantity deciding unit 182a obtains the RSCP and ISCP at step S12a. The second statistics quantity deciding unit 182b obtains the RSSI at step S12b. The first statistics quantity deciding unit 182a decides the average PV and variance PV of the distribution of correlation values in a time transition of which a path exists at step S14a. In addition, the second statistics quantity deciding unit 182b decides the average NA and variance NV of the distribution of correlation values in a time transition of which a path does not exist at step S14b. In addition, the first cumulating unit 184a cumulates the PA and PV and obtains PA_add and PV_add at step S16a. The second cumulating unit 184b cumulates the NA and NV and obtains NA_add and NV_add at step S16b.

The assigned number-of-paths determining unit 185 determines at step S18 whether or not the number of paths assigned to the pilot channel reaches the upper limit of paths that can be assigned. In other words, the assigned number-of-paths determining unit 185 determines whether or not the paths have been assigned to all fingers.

When the number of paths assigned to the pilot channel does not reach the upper limit of paths that can be assigned, that is NO at step S18, the first distribution position estimating unit 186*a* and the second distribution position estimating unit 186*b* decide TH_A and TH_B for a finger whose PA_add is the maximum, respectively at step S20*a*.

When the number of paths assigned to the pilot channel reaches the upper limit of paths that can be assigned, that is Yes at step S18, the first distribution position estimating unit 186*a* and the second distribution position estimating unit 186*b* decide TH_A and TH_B of a finger whose PA_add is the minimum, respectively at step S20*b*.

Thereafter, the averaging operation determining unit 188 determines whether or not the relation of TH_A>TH_B is satisfied at step S22. When the relation of TH_A>TH_B is not satisfied, that is NO at step S22, the averaging operation controlling unit 18 awaits until the next operations of the correlation detecting unit 122 and the profile averaging unit 124 are completed at step S24.

In T12 shown in FIG. 8, since the relation of TH_A≦TH_B is satisfied, the averaging operation controlling unit 18 awaits until the next operation timings (in T20) of the correlation detecting unit 122 and the profile averaging unit 124 are completed. At the same timing as the operation timings (in T20) of the correlation detecting unit 122 and the profile averaging unit 124, the level measuring unit 16 and the total reception level measuring unit 17 also operate (in T21).

The averaging operation controlling unit 18 controls an averaging operation in accordance with the RSCP and ISCP measured by the level measuring unit 16 and the RSSI measured by the total reception level measuring unit 17 (in T22). At that point, as shown in FIG. 7, the first statistics quantity deciding unit 182*a* obtains the RSCP and ISCP at step S12*a*. The second statistics quantity deciding unit 182*b* obtains the RSSI at step S12*b*. Thereafter, the foregoing process is performed. Since the relation of TH_A>TH_B is not satisfied, that is No at step S22, the averaging operation controlling unit 18 awaits until the next operations of the correlation detecting unit 122 and the profile averaging unit 124 are completed at step S24. In the foregoing manner, the profile averaging unit 124 repeats the averaging operation.

Assuming that the N-th averaging operation has caused the relation of TH_A>TH_B to be satisfied (in T30), since the relation of TH_A>TH_B is satisfied, that is Yes at step S22, the profile averaging unit 124 completes the averaging operation, not the (N+1)-th averaging operation. The path detecting unit 126 outputs a plurality of path timings and path levels at step S26.

According to the foregoing embodiment of the present invention, since the number of times for the averaging operation is controlled in accordance with the reception state of the pilot channel received along with the base band signal, the number of times for the averaging operation can be controlled in accordance with the current reception state. In addition, since the number of times for the receiving operation is not controlled in accordance with the output of the correlation detecting unit 122, the control for the number of times for the averaging operation is not affected by the accuracy of the output of the correlation detecting unit 122.

Alternatively, the foregoing embodiment can be accomplished in the following manner. A medium on which a program that accomplishes each of the foregoing units (for example, each unit of the averaging operation controlling unit 18) are recorded is read by a medium reading device of a computer that has a CPU, a hard disk, a flash memory, and a medium (floppy (registered trademark) disk, a CD-ROM, a memory stick (registered trademark), or the like) to a hard disk, a flush memory, or the like. In that manner, the foregoing function can be accomplished.

The foregoing describes the principles of the invention. Thus, it will be noted that although not explicitly described or shown herein, those skilled in the art will be able to devise various modifications which embody the principles of the invention and are within the spirit and scope of the following claims.

What is claimed is:

1. A portable information communication terminal, comprising:
    correlation detecting means for detecting correlation of a received base band signal and a reference code sequence;
    averaging means for averaging an output of said correlation detecting means;
    path detecting means for detecting a path of the received base band signal in accordance with the output of said averaging means;
    first reception state measuring means for measuring a reception state of a simultaneous received signal simultaneously received along with the received base band signal;
    averaging operation controlling means having first distribution position estimating means for estimating a distribution of correlation values at a timing of which a path exists in accordance with the reception state of the simultaneous received signal, and being configured for controlling a number of times for an averaging operation by said averaging means in accordance with an output of said first distribution estimating means;
    assigned number-of-paths determining means for determining whether or not the number of paths to which the simultaneous received signal is assigned reaches an upper limit of paths that can be assigned; and
    wherein said first distribution position estimating means is configured to measure a reception state of a path of which the simultaneous received signal is (i) in a maximum level when the assigned number of paths does not reach the upper limit, and (ii) in a minimum level when the assigned number of paths reaches the upper limit.

2. The portable information communication terminal as set forth in claim 1, wherein;
    the simultaneous received signal is a pilot channel.

3. The portable information communication terminal as set forth in claim 1, wherein;
    the reception state of the simultaneous received signal is a required received signal code power (RSCP) and an interference signal code power (ISCP).

4. The portable information communication terminal as set forth in claim 1, wherein;
    said first distribution position estimating means is configured to estimate a distribution of correlation values at a timing of which a path exists in accordance with a reception state of a path of which the simultaneous received signal is in the maximum level.

5. The portable information communication terminal as set forth in claim 1, wherein;
    said first distribution position estimating means is configured to estimate a distribution of correlation values at a timing of which a path exists in accordance with a reception state of a path of which the simultaneous received signal is in the minimum level.

6. The portable information communication terminal as set forth in claim 1 wherein;
    said first distribution position estimating means is configured to decide a lower limit value of the distribution of correlation values at a timing of which a path exists.

7. The portable information communication terminal as set forth in claim 1, further comprising:
second reception state measuring means for measuring a reception state of the received base band signal, wherein;
said averaging operation controlling means is configured to control the number of times for the averaging operation by said averaging means in accordance with the measured reception state of the simultaneous received signal and the measured reception state of the received base band signal.

8. The portable information communication terminal as set forth in claim 7, wherein;
the reception state of the received base band signal is a received signal strength indicator (RSSI).

9. The portable information communication terminal as set forth in claim 7, wherein;
said averaging operation controlling means has second distribution position estimating means for estimating a distribution of correlation values at a timing of which a path does not exist in accordance with the reception state of the received base band signal; and
said averaging operation controlling means is configured to control the number of times for the averaging operation by said averaging means in accordance with an output of said second distribution position estimating means.

10. The portable information communication terminal as set forth in claim 9, wherein;
said second distribution position estimating means is configured to decide an upper limit value of the distribution of correlation values at a timing of which a path does not exist.

11. A method for performing an averaging operation controlling process for a portable information communication terminal, the method comprising:
correlating a received base band signal and a reference code sequence;
averaging an output at said correlation detecting step;
detecting a path of the received base band signal in accordance with the output of said averaging step;
measuring a reception state of a simultaneous received signal simultaneously received along with the received base band signal;
estimating a distribution of correlation values at a timing of which a path exists in accordance with the reception state of the simultaneous received signal;
controlling a number of times for averaging operation at said averaging step in accordance with an output of said estimating step;
determining whether or not a number of paths to which the simultaneous received signal is assigned reaches an upper limit of paths that can be assigned; and
wherein said estimating step includes measuring a reception state of a path of which the simultaneous received signal is (i) in a maximum level when the assigned number of paths does not reach the upper limit, and (ii) in a minimum level when the assigned number of paths reaches the upper limit.

12. A computer readable recording medium storing a program readable by a computer, the program causing the computer to execute an averaging operation controlling process for a portable information communication terminal, comprising:
correlation detecting means for correlating a received base band signal and a reference code sequence;
averaging means for averaging an output of said correlation detecting means;
path detecting means for detecting a path of the received base band signal in accordance with the output of said averaging means;
first reception state measuring means for measuring a reception state of a simultaneous received signal simultaneously received along with the received base band signal;
averaging operation controlling means having first distribution position estimating means for estimating a distribution of correlation values at a timing of which a path exists in accordance with the reception state of the simultaneous received signal, and being configured for controlling a number of times for an averaging operation by said averaging means in accordance with an output of said first distribution estimating means;
assigned number-of-paths determining means for determining whether or not the number of paths to which the simultaneous received signal is assigned reaches an upper limit of paths that can be assigned; and
wherein said first distribution position estimating means is configured to measure a reception state of a path of which the simultaneous received signal is (i) in a maximum level when the assigned number of paths does not reach the upper limit, and (ii) in a minimum level when the assigned number of paths reaches the upper limit.

* * * * *